April 1, 1958 E. V. FLANDERS Re. 24,448

METHOD OF GRINDING, INCLUDING GRINDING WHEEL FORMING

Original Filed Nov. 20, 1953 2 Sheets-Sheet 1

Inventor
Ernest V. Flanders
Wm O Moeser
Atty.

April 1, 1958 E. V. FLANDERS Re. 24,448
METHOD OF GRINDING, INCLUDING GRINDING WHEEL FORMING
Original Filed Nov. 20, 1953 2 Sheets-Sheet 2
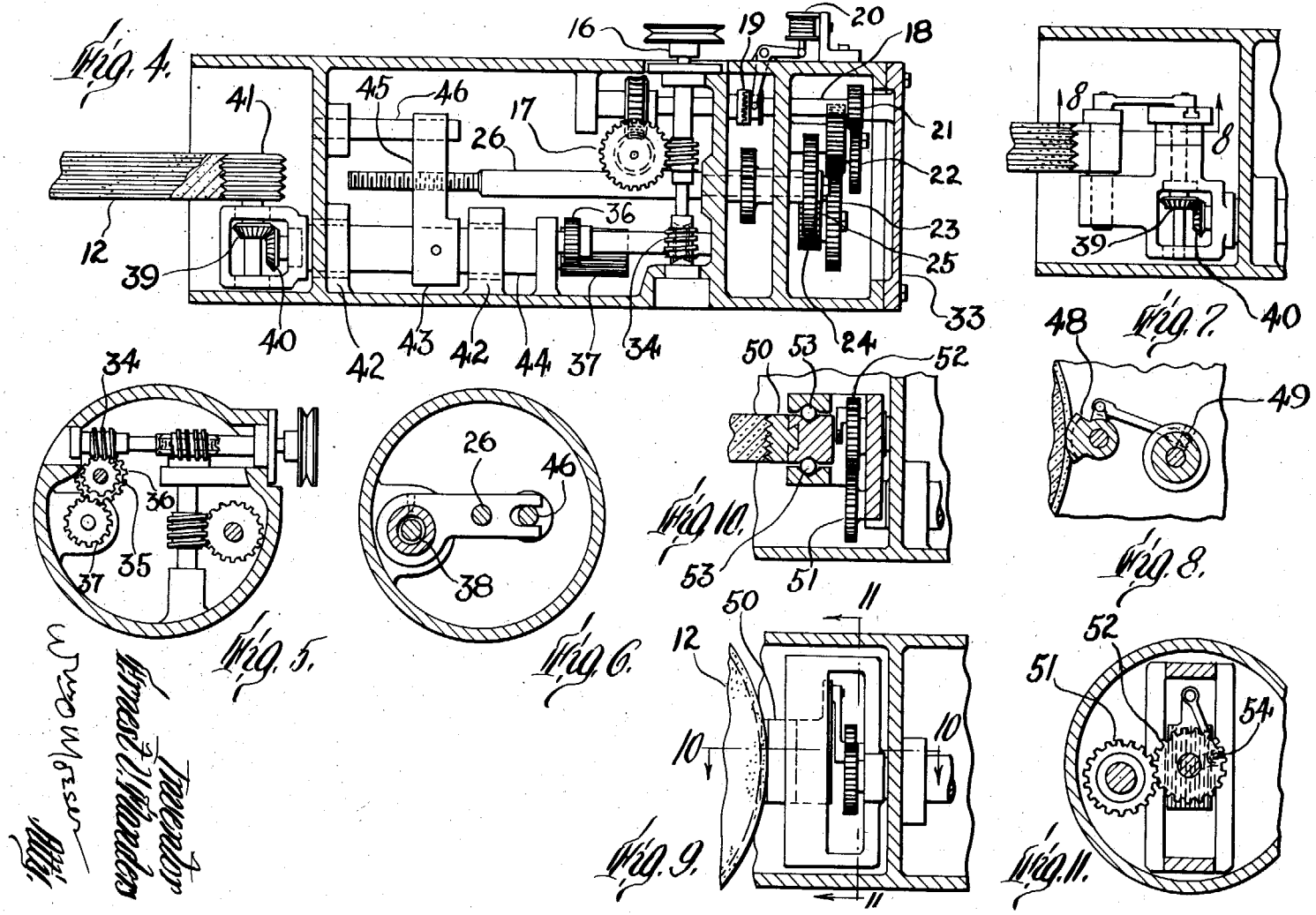

United States Patent Office

Re. 24,448
Reissued Apr. 1, 1958

24,448

METHOD OF GRINDING, INCLUDING GRINDING WHEEL FORMING

Ernest V. Flanders, by Jones and Lamson Machine Company, Springfield, Vt., assignee Original No. 2,778,170, dated January 22, 1957, Serial No. 393,260, November 20, 1953. Application for reissue October 21, 1957, Serial No. 693,500

5 Claims. (Cl. 51—283)

Matter enclosed in heavy brackets [ ] appears in the original patent but forms no part of this reissue specification; matter printed in italics indicates the additions made by reissue.

This invention relates to new and useful improvements in grinding machines, and relates more particularly to novel means for shaping the periphery of grinding wheels to a desired form.

Heretofore, grinding wheels have been dressed by either of two methods: (1) roller crusher dressing; and (2) diamond dressing. In roller crusher dressing it is common practice to press a roll of steel or other suitable material firmly against the grinding wheel, and positively drive the roll or wheel at a relatively slow speed. The grinding wheel or roll is thus driven at substantially the same peripheral velocity, and the roll acts in such a way as to crush or pulverize the grinding wheel grains to thereby produce on the wheel a complement of the crusher roll shape. This method is satisfactory in many cases, particularly on work not requiring the utmost in precision and finish. However, it is not possible to crush dress the many so-called resinoid or rubber bonded abrading wheels. Such wheels cannot be broken down or pulverized successfully to desired forms by a crushing process.

In diamond dressing, a diamond tool is applied to the wheel and guided in such a path as to produce a desired form on the wheel. Many mechanisms have been proposed for the accurate location and precision movement of the diamond tool. The action is rather analogous to cutting on a lathe or similar machine tool, and is normally done at speeds higher than crush dressing speeds, yet substantially lower than actual work grinding speeds. Typical crushing speeds may be in the order of only 400 peripheral feet per minute; diamond truing speeds may be in the order of 2000 peripheral feet per minute; whereas actual grinding is usually done at speeds of 8000 feet per minute or higher in modern high level production.

On any known grinding machines, therefore, actual production must be interrupted periodically for a wheel dressing operation, whether it be performed by crusher roll or diamond tool. This operation requires a slowdown of the wheel to wheel truing speeds, and after the dressing operation takes place, the wheel must be accelerated back to grinding speeds. This process, it can readily be appreciated, is time-consuming and therefore costly.

In accordance with this invention, I propose a new method of forming wheels which overcomes the difficulties described briefly above and which provides great advantages as will be pointed out hereinafter.

A further object of my invention is to provide a method of wheel forming suitable for all types of wheels regardless of the bond or grit employed, and to a degree of accuracy equal to that achieved by the best conventional methods.

These and other objects and advantages of my invention will become readily apparent from the following specifications and drawings, in which Figure 1 is a view in elevation of wheel forming apparatus embodying my invention;

Figure 4 is a plan view of the apparatus shown in Figure 1;

Figure 5 is a detail of the gear train forming part of the mechanism of Figure 4;

Figure 6 is a view on the section lines 6—6 of Figure 1;

Figure 7 shows a modification of the forming tool drive mechanism;

Figure 8 is a view on the section lines 8—8 of Figure 7;

Figure 9 is a further modification of the drive mechanism shown in Figure 7;

Figure 10 is a view on the section lines 10—10 of Figure 9;

Figure 11 is a view on the section lines 11—11 of Figure 9.

Figures 1, 2, 3:
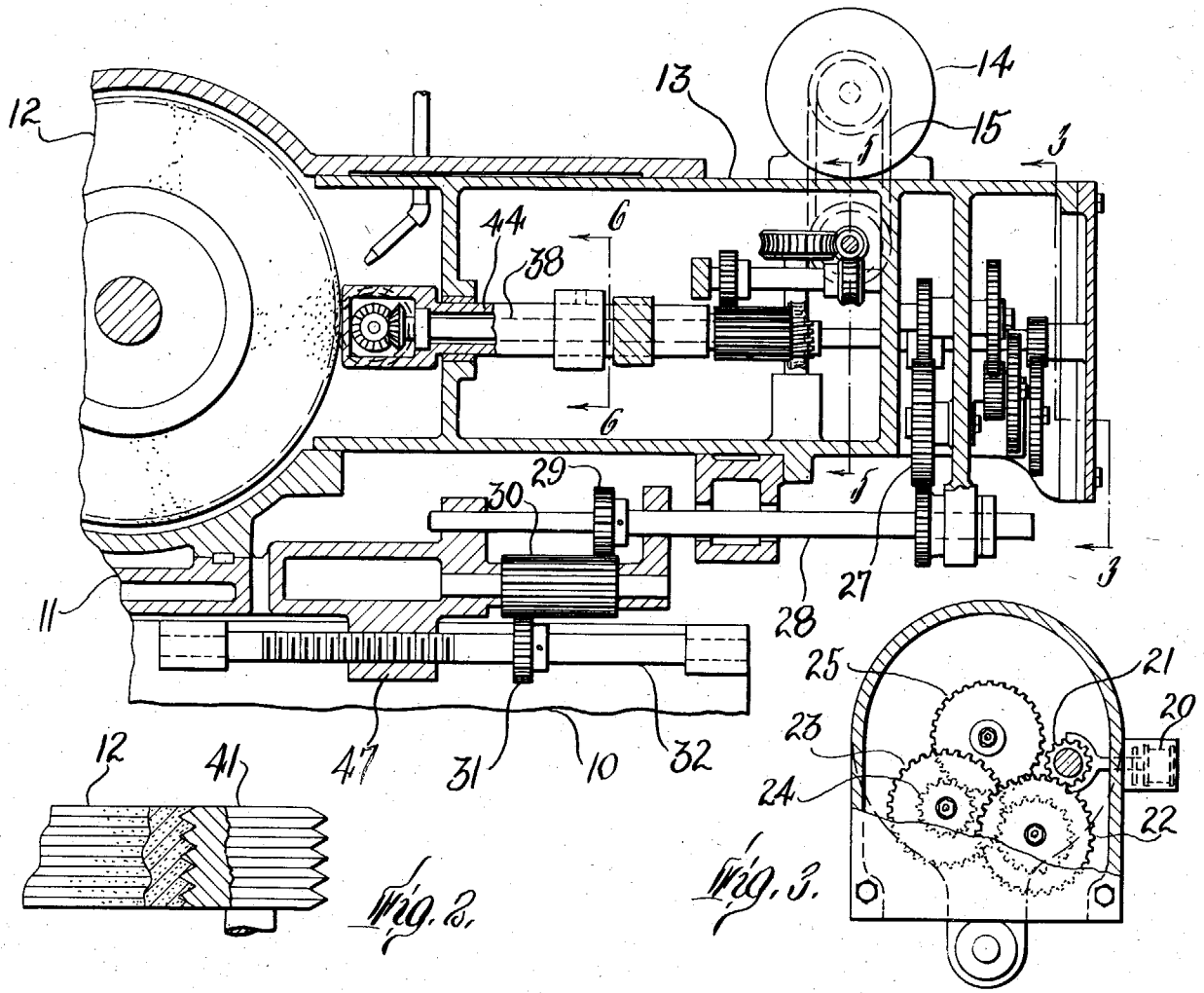
Figure 2 is a detailed view, partly in section, of a wheel forming roll in contact with a grinding wheel.
Figure 3 is a view on section lines 3—3 of Figure 1.

Briefly stated, my invention contemplates the use of a tool which may be in the form of a roll made preferably of a hard and abrasive substance like diamond particles held in a bonding material, or matrix. This roll is formed so as to have on its periphery a complement of the shape which it is desired to produce on a grinding wheel. The roll is forced against the grinding wheel, while the wheel is in rotation under power, and the roll is also rotated or oscillated under power so that successive portions thereof are brought into contact with the grinding wheel.

The wheel may be in continuous operation, rotating at actual grinding speeds, and, if desired, may be performing grinding operations even while the wheel form is being maintained at another point on its periphery.

Referring more particularly to the drawings, I have shown a portion of a grinding machine sufficient to illustrate the invention, having a bed 10 on which is mounted a grinding wheel slide 11. The wheel slide may be mounted on ways (not shown) for motion radially toward and away from a grinding point on the machine as is well understood in the art. The slide 11 carries a cylindrical housing 13 which contains the wheel forming mechanism. The arrangement of this housing 13 and its relationship to the grinding wheel is somewhat similar to that in U. S. Patent 2,578,531, granted December 11, 1951, to Ernest V. Flanders et al.

Mounted on housing 13 is a motor 14 which may be any suitable constant speed motor providing power through belts or the like 15 to the shaft 16. Through worm 17, the rotation of shaft 16 is transmitted to shaft 18, when a dog clutch 19 operated by a solenoid 20 is in the engaged position. When clutch 19 is engaged, the shaft 18 is driven by the motor 14 and this motion is transmitted through gear train 21, 22, 23, 24, 25 to a shaft 26. Through an idler gear 27, best shown in Figure 1, a shaft 28 is rotated at the same speed as the shaft 26. The shaft 28 is journaled in and moves with the wheel slide 11.

On shaft 28 is a pinion 29, which drives a lead screw 32 through a wide faced idler 30 and pinion 31. The pinions 29 and 31 are the same size, and therefore it can be seen that the lead screw 32, journaled in the bed 10, the shaft 28, and the shaft 26 (Fig. 4) all rotate at the same speed when the clutch 19 is engaged. When the clutch 19 is disengaged by energization of the solenoid 20, the motor 14 merely idles and the entire gear arrangement to the shafts 26, 28 and screw 32 is at rest. I provide a cover plate 33 which may be removed for conveniently changing the gear ratio in the train, best shown in Figure 3. Through change gears any desired rate of rotation of shaft 26 and screw 32 may be obtained. I prefer to employ a relatively slow rate of rotation, in the order of one-tenth of a revolution per minute, for reasons which will appear hereinafter.

In addition to driving the gear train (Figure 3) the shaft 16 has a second power take-off portion comprising a worm 34 and gear 35. This gear combination drives a pinion 36 which meshes with a wide faced gear 37.

The gear 37 is on a shaft 38 journaled in the housing 13. At the forward end of shaft 38 I provide a pair of bevel gears 40 and 39, best shown in Figure 4, which impart rotary motion to a wheel forming roll 41. This entire roll driving assembly is slidably mounted in brackets 42. A collar 43 is pinned to the shell 44. A threaded hole in collar extension 45 engages a threaded end portion on the shaft 26. This thread is of the same pitch as the lead screw 32. A yoke (see Figure 6) slidably engages retaining pin 46 which supports the collar assembly. When shaft 26 is rotated, axial motion is transmitted to the collar 43 and thus the roll 41 is slowly advanced toward the grinding wheel 12. During this advancing motion, the roll is continuously rotated through the medium of pinion 36 and gear 37, and bevel gears 39, 40.

Since as heretofore explained the lead screw 32 turns with the shaft 26, it can readily be seen that through a nut portion 47 on the wheel slide 11 engaging the screw 32, the entire wheel slide also moves in the same direction and at the same rate as the motion of the roll 41 toward the grinding wheel. In this manner as the wheel is consumed, the working point on the periphery of the wheel, substantially 180 degrees from the point of forming roll engagement, remains in proper position relative to the work piece. This constant relationship assures accurate and automatic maintenance of work size even though the wheel diameter is constantly decreasing.

Figures 7 and 8 illustrate a modification of the wheel forming assembly to provide an oscillatory motion to a roll or roll segment. The bevel gears 39 and 40 impart an oscillatory motion to the wheel forming segment 48 through an adjustable throw eccentric as at 49.

In Figures 9, 10 and 11, I illustrate mechanism for imparting oscillatory straight line motion to a wheel forming tool in the form of a bar 50. In place of the bevel gear combination 39—40 spur gears 51 and 52 drive the bar 50 up and down on ball slide 53 through an adjustable throw eccentric 54.

In each case, the portion of the wheel forming tools 41, 48 or 50 contacting the grinding wheel is in constant change, while the mechanisms heretofore described advance the wheel forming tool against the wheel at a relatively slow, predetermined rate. This rate may be altered by proper choice of change gears shown in Figure 3 and varies with the character of the grinding wheel itself, the type of workpiece, the complexity of the wheel form being maintained, and the degree of accuracy required.

If the nature of the work is such as to permit several complete cycles with no dressing action, it is merely necessary to energize solenoid 20, thus interrupting the advance of the wheel forming member. This may be done automatically by a cycle counter set to permit engagement to clutch 19 after a predetermined number of work pieces have been ground. In any case, the grinding speed is maintained, and no time consuming slow-down is necessary to maintain wheel form. In some applications, where the grinding process causes rapid wheel wear, as, for example, when operations are being performed on extremely hard or resistant work material, I have found it desirable to leave the clutch 19 in continuous engagement during grinding. Of course, it is desirable to disengage the clutch 19 during the unloading of the finished work and the loading of a new workpiece to avoid unnecessary wheel consumption. In such a case, the solenoid 20 may be included in an automatic work loading cycle, or interlocked with a work fixture, chuck or the like to operate without further attention.

I have found the methods described herein to be effective on resinoid as well as on vitrified wheels. In conventional crush dressing it is essential to drive the wheel and roll at substantially the same low peripheral velocity. The random pulverization, effective only on vitrified wheels, leaves a wheel surface which is inferior to that produced by my continuous process carried out at high speeds. My continuous wheel forming process results in a free-cutting, open grained wheel, yet with a fine structure to insure long life and work of high accuracy and finish.

Continuous wheel forming in accordance with this invention is most advantageous in that it enables the user to combine high accuracy with a high rate of production. Heretofore, maximum stock removal rates could not be employed where the grinding wheel broke down between the start and the finish of the grinding operation on a single workpiece. Heavy cuts resulted in wheel breakdown which was enough to cause a loss of accuracy. In the typical case the form produced would deviate from the desired standard before the operation was finished. In grinding a worm gear from the solid, for example, the initial turns of the thread would be correctly formed, but the last threads would be of reduced depth because of wheel breakdown and finish would be impaired because of the declining efficiency of the grinding wheel as the grinding progressed.

In such cases, it has been customary to take an initial heavy roughing cut. A subsequent finishing pass with a freshly trued wheel was then made with a lighter cutting load such that the entire workpiece could be finished without serious loss in the workpiece size, form, or finish. In a thread depth of .250 of an inch, for example, the initial pass might be set to remove .240 of stock, without regard to final accuracy. A subsequent finishing cut could successfully remove the final .010 of stock and produce acceptable work. This method of approach, while achieving the desired end, is time consuming and therefore expensive.

In continuous wheel forming as taught herein, on the other hand, the high stock removal rates (heretofore achieved on roughing cuts only) can now be realized with the heavy cuts producing the final desired form on the workpiece. The grinding wheel is continuously corrected so that the last part of the grinding pass is accomplished with the same accuracy and efficiency as the first part of the grinding pass. Thus wheel truing time is not added to total time expended. Furthermore, work usually requiring two or more passes is now finished in a single cutting operation.

The time savings are spectacular and of particular importance in modern mass production where standards of accuracy are becoming higher. It is becoming necessary to achieve close grinding tolerances on more and more parts, and continuous wheel forming with automatic size control has proven to be a significant advance in the art.

The roll 41 may be rotated at a steady, slow rate, for example, 60 R. P. M., in either direction, while the grinding wheel continues to work at normal grinding speeds. If the shaft 26 is geared to turn 30 degrees per minute, and the threaded portion has 10 threads per inch, the wheel forming tool will advance at the rate of one-half inch per hour. The foregoing example describes typical rates which I have found desirable for a given set of grinding conditions.

While I have illustrated and described preferred embodiments of my invention, the foregoing is by way of illustration only of a novel wheel forming method which radically departs from conventional practice as hereinbefore described.

I claim:

1. During a grinding operation, the method of maintaining the working point on the periphery of a grinding wheel in proper relation to a workpiece being ground, said wheel having a desired form, that comprises grinding said workpiece with said wheel whereby the diameter of said wheel decreases at a determinable attrition rate, feeding substantially radially into said wheel a member shaped to the complement of the desired form of said wheel at a constant, positive forming rate greater than said attrition rate, rotating said wheel and said member at different peripheral speeds and simultaneously advancing said wheel towards said workpiece at a rate substantially equal to said forming rate.

2. During a grinding operation, the method of maintaining the working point on the periphery of a grinding wheel in proper relation to a workpiece being ground, said wheel having a desired form, that comprises grinding said workpiece with said wheel whereby the diameter of said wheel decreases at a determinable attrition rate, feeding substantially radially into said wheel a member shaped to the complement of the desired form of said wheel at a constant, positive forming rate greater than said attrition rate, rotating said wheel and said member at substantially different peripheral speeds and simultaneously advancing said wheel towards said workpiece at a rate substantially equal to said forming rate.

3. A method as defined in claim 1 in which said wheel and said member are rotating in opposite directions.

4. During a grinding operation, the method of maintaining the working point on the periphery of a grinding wheel in proper relation to a workpiece being ground, said wheel having a desired form, that comprises grinding said workpiece with said wheel whereby the diameter of said wheel decreases at a determinable attrition rate, feeding substantially radially into said wheel a member shaped to the complement of the desired form of said wheel at a constant, positive forming rate greater than said attrition rate, said member comprising a roll of hard abrasive material including diamond particles held together by a bonding substance, rotating said wheel and said member at different peripheral speeds and simultaneously advancing said wheel towards said workpiece at a rate substantially equal to said forming rate.

*5. The method of wheel trueing by maintaining the working point on the periphery of a grinding wheel in proper relation to a workpiece being ground during a grinding operation, said wheel having a desired form, that comprises: grinding said workpiece with said wheel whereby the diameter of said wheel decreases at a determinable attrition rate; feeding substantially radially into said wheel a member shaped to the complement of the desired form of said wheel at a constant, positive forming rate greater than said attrition rate; rotating said wheel and said member at different peripheral speeds; and simultaneously advancing said wheel towards said workpiece at a rate substantially equal to said forming rate, said advance being in addition to the advance producing said grinding operation.*

References Cited in the file of this patent or the original patent

UNITED STATES PATENTS

| | | |
|---|---|---|
| 821,621 | Dunn | May 29, 1906 |
| 1,126,023 | Johnson | Jan. 26, 1915 |
| 1,313,702 | Kreiger | Aug. 19, 1919 |
| 1,896,533 | Vuilleumier | Feb. 7, 1933 |
| 2,100,954 | Gould | Nov. 30, 1937 |
| 2,333,304 | Ernst | Nov. 2, 1943 |
| 2,347,283 | Ross | Apr. 25, 1944 |
| 2,576,239 | Reimschissel | Nov. 27, 1951 |

FOREIGN PATENTS

| | | |
|---|---|---|
| 610,978 | Germany | Mar. 20, 1936 |